3,255,290
LABORATORY ARC FURNACE
James H. Ahrendt, West 1417 Nora Ave.,
Spokane 12, Wash.
Filed Aug. 16, 1963, Ser. No. 302,542
4 Claims. (Cl. 13—9)

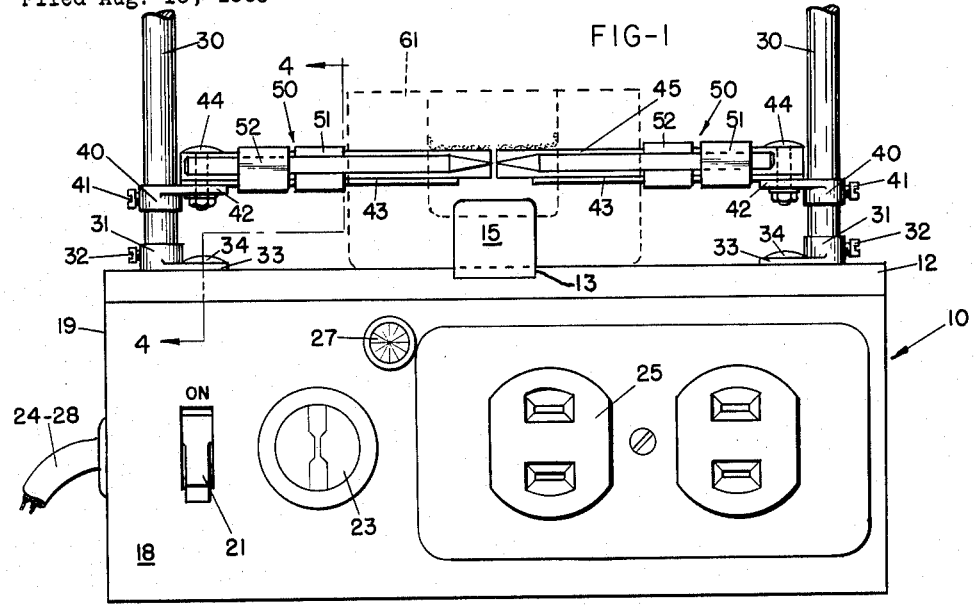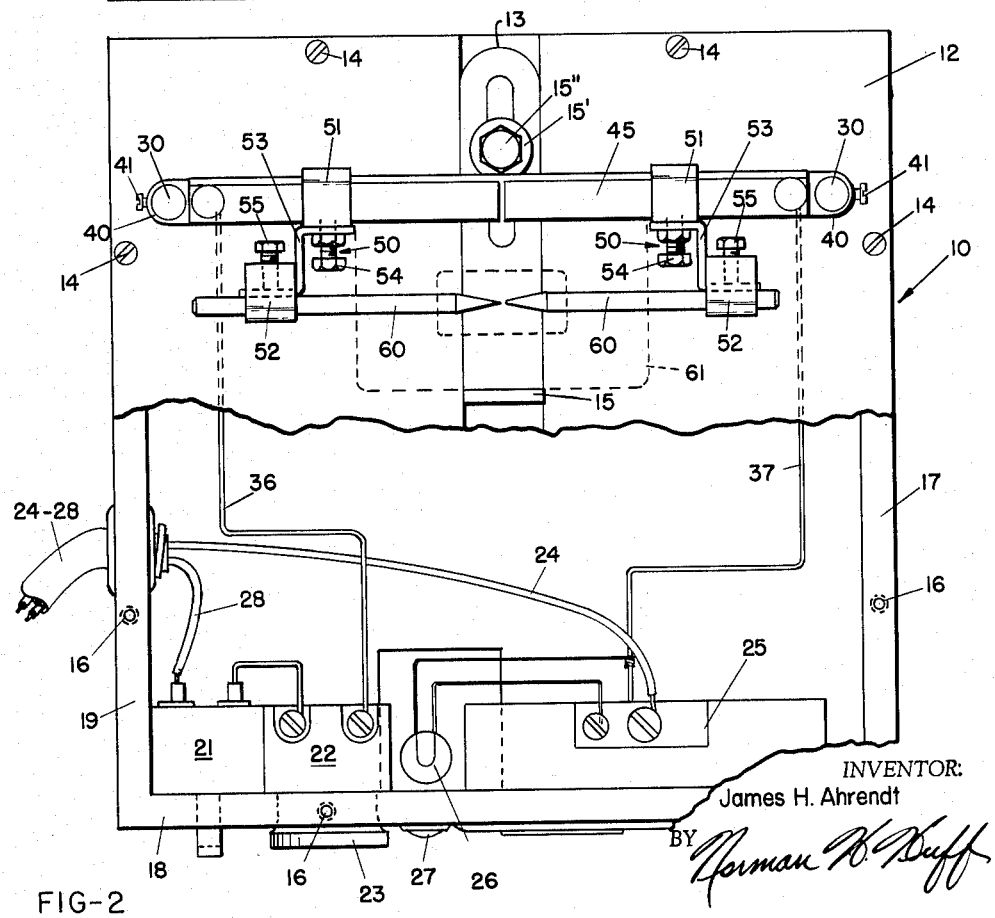

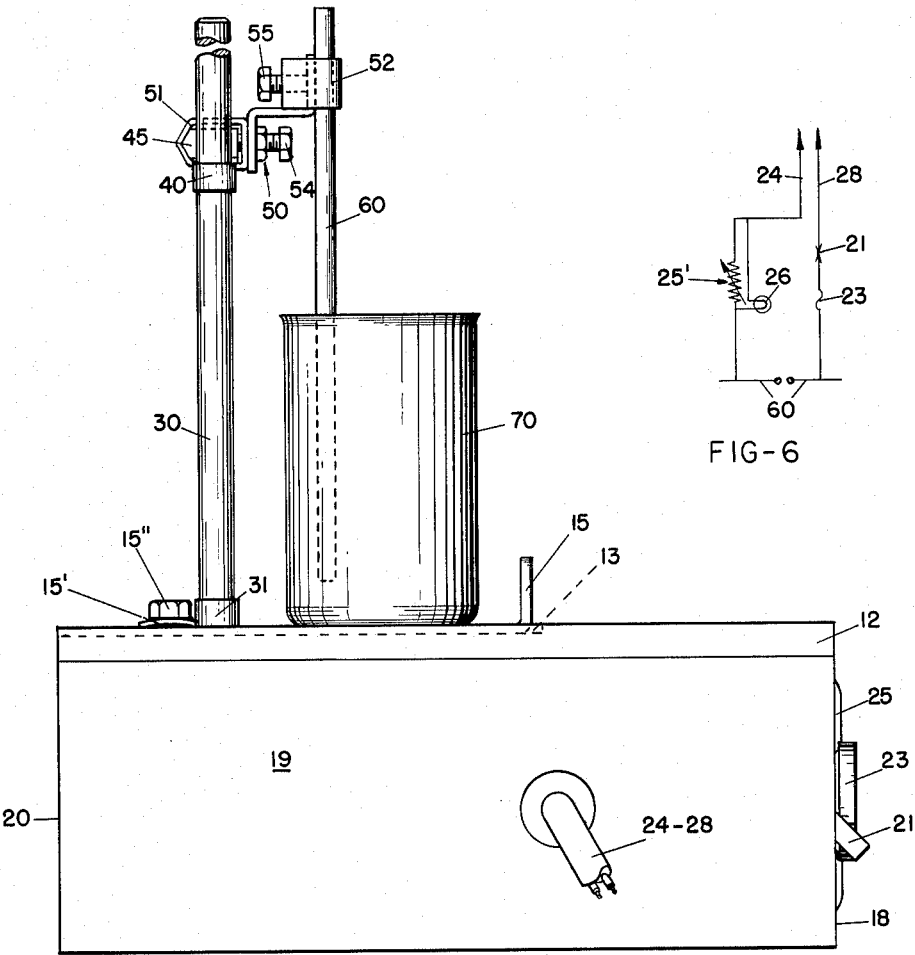

My present invention relates to the field of metallurgy and more particularly to a laboratory arc furnace particularly suitable for analysis of materials and instruction.

There is a decided need for a laboratory arc furnace for use in high school and college science and physics classrooms and in industry for a small inexpensive arc furnace for efficient and inexpensive analyses.

The present invention seeks to provide an arc furnace specifically designed to fulfill these requirements, and it is an object of the present invention to provide a laboratory arc furnace which is constructed of a minimum number of parts uniquely arranged to provide for infinite variations in the relative positions of a pair of electrodes having an electrical potential therebetween.

It is another object of the present invention to provide in a laboratory arc furnace a unique arrangement of parts serving the dual functions of providing physical support for the electrodes and also providing the electrical circuits to energize said electrodes.

It is yet another object of the present invention to provide an inexpensive laboratory arc furnace by bringing into a novel combination a number of conventional readily obtainable components to result in the desired furnace.

It is yet another object of the present invention to provide in an inexpensive laboratory arc furnace for selectively varying the resistance in the arcing circuit to thereby control the temperatures generated.

It is yet a further object of the present invention to provide an inexpensive laboratory arc furnace which is operated from a conventional 110 or 220 volt outlet source of electrical power.

These and other objects of the present invention will become apparent to those skilled in the art during the reading of the following specification when considered in conjunction with the accompanying drawings wherein:

FIGURE 1 is a full scale vertical elevation of my improved arc furnace having portions broken away and shown by dotted lines for convenience of illustration;

FIGURE 2 is a full scale plan view of the same device as in FIGURE 1, having portions broken away for convenience of illustration;

FIGURE 3 is a full scale side elevation of the device of FIGURE 1 viewed 90 degrees from the view of FIGURE 1, showing the electrodes in another of their variable positions;

FIGURE 4 is a fragmentary full scale section taken substantially on the planes indicated by line 4—4 of FIGURE 1 in the direction indicated by the arrows thereon;

FIGURE 5 is a vertical longitudinal full scale section of my preferred crucible; and FIGURE 6 is a wiring diagram.

Referring now more particularly to the drawings the numeral 10 designates a box which constitutes a base for the laboratory arc furnace and may be made of any convenient heat-resistant, non-conductive material, such as asbestos sheeting, to provide means capable of withstanding the heat which may accidentally be applied to the box and to simplify the insulation for the electrical circuit. While I prefer to form the box of a material such as sheet asbestos, obviously this is a matter of choice.

The box 10 is provided with a top 12 which is releasably secured in covering relation thereto by means of conventional screw fasteners 14 threaded into internally threaded bores 16 formed in the vertical side walls 17, 18, 19, and 20 of the box.

To simplify the electrical insulation as well as to reduce the transmission of heat I prefer to form the top 12 from sheet asbestos. The top thus constitutes a supporting member for a major portion of the arc furnace.

In wire 28 and mounted in the front wall 18 of the box 10 I provide a conventional off-on switch 21 and a series connected screw socket 22 which receives and electrically connects a fuse 23 of the desired capacity. In the other wire 24 of the electrical circuit I connect a conventional outlet receptacle 25 and an impedance lamp 26 which is disposed to glow through the jewel 27. These electrical components and the circuit wires 24 and 28 are preferrably of standard construction for 110 or 220 volt operation.

The lamp 26 provides a constant resistance in the arcing circuit to preclude accidental short circuit while initiating the arcing process and also enables one to determine whether the electrodes 60 are physically touching each other. The resistance 25' is variable by "plugging in" various resistances of known impedance to the outlet receptacle 25.

A comparative examination of FIGURES 1, 2 and 4 will reveal that the pair of conducting spaced parallel posts 30—30 are supported at their lower ends in sleeves 31 and releasably secured therein by set bolts 32. The sleeves 31 have ears 33 which are disposed in face to face engagement with the top 12 and are secured thereto by means of bolts 34 and co-operating nuts 35 which also electrically connect the respective wires 36 and 37 of the electrical circuit to the posts 30 through the sleeves 31. An electrical potential may be induced through the respective wire 36 or 37 to their respective posts 30.

A second sleeve 40 encircles each of the posts 30 and is telescopically associated therewith for movements to vertically adjusted positions. Set bolts 41 are provided to secure the sleeves 40 at selected points along the posts 30 in accordance with the selection of the operator. Each of the sleeves 40 is provided with a conductive flange 42 which extends inwardly toward the other and has a conductive flange extension 43 electrically and physically connected therewith by means of bolt and nut combinations 44 which also secure the opposed ends of non-conductive electrode support bars 45. The sleeves 40 and electrode support bars 45 preferably move as a unit vertically on the posts 30 and may be secured at any vertical disposition selected by the operator.

Articulate linkage 50 which is comprised of a pair of clevis members 51 and 52 interconnected by a somewhat Z-shaped member 53 provides means for supporting the electrodes 60—60. Each of the clevises 51 and 52 is provided with a set bolt 54 or 55; this admits of selectively releasing and clamping the clevises 51 along the length of the electrode support bars 45 and thus adjusting the electrode clevises 52 toward and away from each other and for pivoting the Z member 53 about the bolt 54 and thus changing the relative angularity of the electrodes 60, for example as seen in FIGURE 3 of the drawing. For adjusting the electrodes toward and away from each other said bolts 55 may be employed. Obviously then articulate linkage 50 provides means mounting the electrodes for selective positioning relative to each other.

When desired, longer bolts 54 may be substituted to enable one to space the electrodes further from the bars 45 wherein the Z member 53 will be secured adjacent to the head of bolt 54 by a lock nut.

The top or flat supporting member 12 is provided with a groove as seen at 13 in which slides a clamping member 15 secured by a tensioning washer 15' and a tension bolt 15″. The anchor member 15 is provided to clamp the crucible 61 against the electrode support bars 45 as shown by broken lines of FIGURE 1. It is recessed into the groove 13 to provide a flat supporting surface on the supporting member 12 so that other components such as the container 70, may be supported thereon with respect to the electrodes 60.

The crucible 61 is provided with axially aligned diametrically opposed bores 62 adapted to receive the electrodes 60 in close tolerance so that at least a portion thereof is disposed within the crucible. The crucible is fabricated from a plurality of soapstone strips 63 secured together by a refractory mortar or other mechanical means and defines a central well 64 closed at its top by a removable cover 65.

The wall 66 of woven graphite cloth is disposed within the crucible above the bores 62 and provides severally, a support wall, a heat conducting mantle, a preamble as to heat yet non-filtering as to molten metal screen causing the material adjacent thereto to be subjected to the high temperatures of an arc sprung beween the electrodes 60.

Another bore 67 is formed through a wall of the crucible into the well 64 above the wall 66 and is provided with a clay tube 68 through which spectro-analysis of the material and gasses may be conducted or a vacuum line may be secured to draw off the gasses discharged by heating when the plug (not shown) is removed.

In addition to the reduction of metals, which the present invention obviously will perform, experiments of electrolysis may be conducted by the arrangement disclosed in FIGURE 3 of the drawing. Other metallurgical experiments, laboratory function and instruction may be performed by those skilled in the art.

It is to be noted that the device is particularly designed to employ the readily available A.C. currents and may be easily converted from 110 v. to 220 v. merely by substituting a 220 volt lamp for the 110 volt lamp at 26.

Having thus described by invention, what I desire to secure by Letters Patent of the United States is the following:

1. An arc furnace for laboratory use, comprising:
   a box constituting a base for said furnace;
   a flat supporting member of non-conductive material constituting a top for said box;
   a pair of conductive spaced parallel posts fixed to and extending perpendicularly with respect to said supporting member, outwardly from said box;
   electrical wiring adapted for interconnection with a conventional 110 volt alternating current source of electrical energy, one lead thereof connected to each said post and one lead including in series a fuse, a switch and a 110 volt lamp;
   a conventional 110 volt outlet connected in parallel with said lamp, for selectively interconnecting variable resistances;
   paired opposed non-conductive electrode support bars extending between and releasably secured for selective positioning along the length of said posts;
   a pair of electrodes;
   means mounting said electrodes to said support bar for selective positioning relative to each other and the bar;
   means electrically connecting said electrodes to said posts; and
   a crucible disposed upon said supporting member and adapted to receive at least the end portions of said electrodes.

2. The invention defined in claim 1 and further characterized by said crucible being fabricated from soapstone strips unitized with refractory mortar and having a material receiving upwardly open well;
   a wall of graphite cloth disposed in said well separating it into upper and lower portions;
   said crucible having axially aligned opposed bores through which said electrodes extend into said well below said wall; and
   a cover for said crucible.

3. An arc furnace for laboratory use, comprising:
   a flat supporting member of non-conductive material;
   a pair of spaced parallel posts extending perpendicular from said supporting member;
   a non-conductive electrode support bar extending between said posts and releasably secured thereto for adjustments to selective positions along the lengths of said posts;
   a pair of electrodes;
   means mounting said electrodes upon said electrode support bar for selective positioning relative to each other;
   an electrical circuit connected to apply arcing potential between said electrodes;
   variable resistance in said circuit; and
   a crucible disposed and adapted to receive at least the end portions of said electrodes.

4. In an arc furnace of the class described, a pair of fixed conductive posts spaced from each other;
   an electrical circuit providing an electrical potential between said posts;
   a conductive sleeve encircling each said post and having means for releasably securing each said sleeve to its respective post for selective positioning axially thereof;
   each said sleeve having a conductive flange extending between said posts;
   a pair of electrodes; and
   articulate means physically supporting each said electrode upon electrode support bars each supported on one of said posts for manual manipulation to selective positions relative to each other; and
   said electrodes each being electrically connected to one said flange.

References Cited by the Examiner

UNITED STATES PATENTS 2,337,679  12/1943  Osterberg _____ 13—31

OTHER REFERENCES

"Comptes Rendus," volume 116 (January–June 1893), p. 550.

"Electric Furnaces" (Borchers), 1908, pages 167 and 175.

RICHARD M. WOOD, *Primary Examiner.*

JOSEPH V. TRUHE, *Examiner.*